United States Patent
Acar et al.

(10) Patent No.: US 7,240,552 B2
(45) Date of Patent: *Jul. 10, 2007

(54) TORSIONAL RATE SENSOR WITH MOMENTUM BALANCE AND MODE DECOUPLING

(75) Inventors: Cenk Acar, Irvine, CA (US); Minyao Mao, Santa Rosa, CA (US)

(73) Assignee: BEI Technologies, Inc., San Francisco, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 11/146,310

(22) Filed: Jun. 6, 2005

(65) Prior Publication Data

US 2006/0272411 A1  Dec. 7, 2006

(51) Int. Cl.
G01P 9/04 (2006.01)

(52) U.S. Cl. .................. 73/504.12; 73/504.14

(58) Field of Classification Search ............. 73/504.02, 73/504.12, 504.14, 504.16
See application file for complete search history.

(56) References Cited

U.S. PATENT DOCUMENTS

| | | | |
|---|---|---|---|
| 5,241,861 A | 9/1993 | Hulsing, II | |
| 5,396,797 A | 3/1995 | Hulsing, II | |
| 5,635,640 A | 6/1997 | Geen | |
| 5,869,760 A | 2/1999 | Geen | |
| 5,955,668 A * | 9/1999 | Hsu et al. | 73/504.12 |
| 6,349,597 B1 * | 2/2002 | Folkmer et al. | 73/504.12 |
| 6,892,575 B2 * | 5/2005 | Nasiri et al. | 73/504.12 |

* cited by examiner

Primary Examiner—John E. Chapman
(74) Attorney, Agent, or Firm—Edward S. Wright

(57) ABSTRACT

Rate sensor having a plurality of generally planar masses, a drive axis in the planes of the masses, an input axis perpendicular to the drive axis, and sense axes perpendicular to the drive axis and the input axis. The masses are driven to oscillate about drive axes and are mounted for torsional movement about the sense axes in response to Coriolis forces produced by rotation of the messes about the input axis, with sensors responsive to the torsional movement about the sense axis for monitoring rate of rotation.

31 Claims, 18 Drawing Sheets

TORSIONAL RATE SENSOR WITH MOMENTUM BALANCE AND MODE DECOUPLING

BACKGROUND OF THE INVENTION

1. Field of Invention

This invention pertains generally to angular rate sensors or gyroscopes and, more particularly, to a dual mass rate sensor in which the masses are structurally constrained to oscillate in an anti-phase manner in both drive and sense modes, momentum is balanced, and the drive and sense modes are decoupled.

2. Related Art

In rate sensors or gyroscopes, the use of two coupled proof masses which oscillate in an out-of-phase manner in the drive mode is a common way of balancing the drive momentum in order to minimize the transfer of energy to the substrate. In addition, with the masses being driven in an anti-phase manner, the response of the masses to Coriolis forces will also be out of phase, which allows the effects of external vibrations to be cancelled.

Out-of-phase oscillation in the drive mode is commonly achieved by coupling the two proof masses together with a spring, which has some significant disadvantages. The resulting dynamic system has two resonances—a parasitic in-phase mode and the desired out-of-phase mode, with the in-phase mode always being lower in frequency than the out-of-phase mode. In addition, imperfections in fabrication often result in the masses being of slightly different size, which prevents them from oscillating with equal amplitudes. The unequal oscillations produce an imbalance in momentum and result in undesired transfer of energy to the substrate.

OBJECTS AND SUMMARY OF THE INVENTION

It is in general an object of the invention to provide a new and improved angular rate sensor or gyroscope.

Another object of the invention is to provide a rate sensor or gyroscope of the above character which overcomes the limitations and disadvantages of rate sensors of the prior art.

These and other objects are achieved in accordance with the invention by providing a rate sensor comprising two generally planar proof masses, means for driving the masses to oscillate in phase opposition about parallel drive axes in the planes of the masses, an input axis perpendicular to the drive axes, sense axes perpendicular to the drive axes and the input axis, means mounting the masses for torsional movement about the sense axes in response to Coriolis forces produced by rotation of the masses about the input axis, means constraining the two masses for anti-phase movement about both the drive axes and the sense axes, sensing frames coupled to the masses for movement in response to the torsional movement of the masses about the sense axes, and means responsive to movement of the sensing frames for monitoring rate of rotation about the input axis.

DETAILED DESCRIPTION

Figure 1:
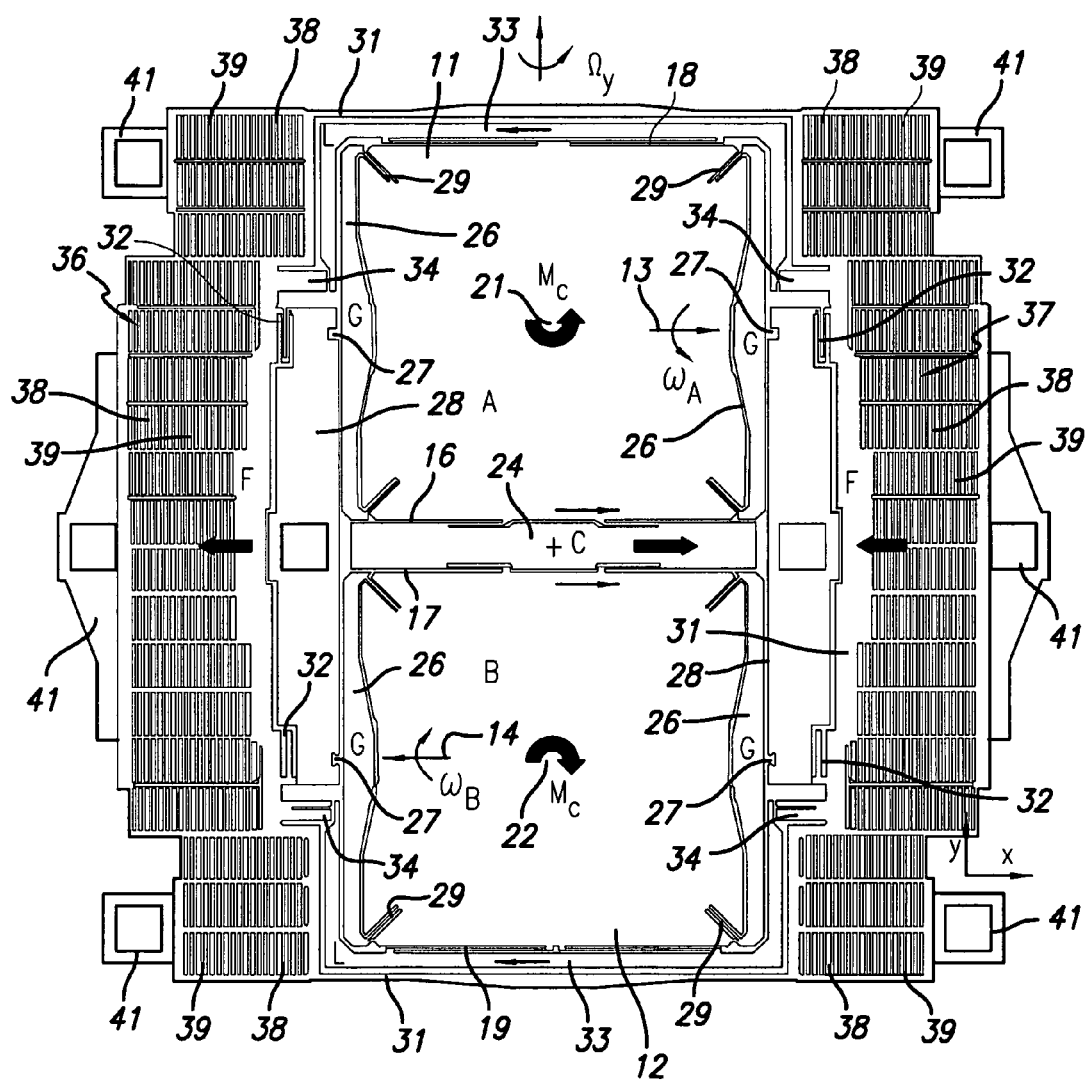
FIG. 1 is a top plan view of one embodiment of a rate sensor incorporating the invention.

As illustrated in FIG. 1, the rate sensor has a pair of generally planar proof masses 11, 12 which lie in an x, y reference plane when the device is at rest. The input axis, i.e. the axis about which angular rate of rotation is measured, is the y-axis, and the proof masses are disposed side-by-side along that axis for torsional movement about a pair of drive axes 13, 14 which extend in a direction parallel to the x axis. The proof masses are driven in an anti-phase manner for out-of-phase movement through the reference plane as they pivot about the drive axes, with the inner edges 16, 17 of the two masses moving together in one direction and the outer edges 18, 19 moving together in the opposite direction.

The proof masses are also mounted for torsional movement about a pair of sense axes 21, 22 which extend in the z-direction, perpendicular to the x, y plane and the other axes. Coriolis forces produced by rotation of the sensor about the y-axis cause the masses to rotate about the sense axes, and since the masses are driven in an out-of-phase manner, they rotate about the sense axes in opposite directions, with inner edges 16, 17 again moving together in one direction and the outer edges 18, 19 moving together in the other.

The midpoints of the inner or adjacent edges of the two proof masses are connected together by a coupling link 24 which has a large out-of-plane stiffness. Thus, the proof masses are constrained to oscillate about the drive axes precisely out-of-phase and with exactly the same amplitude, thereby assuring that the angular momentum is perfectly balanced. In addition, the lowest mode of the overall system automatically becomes the anti-phase drive mode. This cannot be achieved in any previously known coupled mass system.

The coupling link also ensures that the sense mode responses of the proof masses are precisely out-of-phase and equal in amplitude, independent of the operating frequency.

In the embodiment of FIG. 1, each of the proof masses is mounted on a pair of gimbals 26 for the torsional movement about the drive and sense axes. The gimbals are pivotally mounted to anchors 28 by narrow flexures 27 which are aligned with drive axes 13, 14 and permit torsional movement of the gimbals about the drive axes. The proof masses are suspended from the gimbals by flexures 29 which permit torsional movement of the masses about the sense axes. In the embodiment illustrated, flexures 29 are located at the corners of the masses and extend in a diagonal direction, i.e. at an angle of 45 degrees to the x and y axes.

A sensing frame 31 surrounds the proof masses in the x, y plane and is suspended from anchors 28 by folded flexures 32 for linear movement in the x-direction. Flexures 32 are flexible in the x-direction but relatively stiff in the y and z directions so as to constrain the frame for movement in the x-direction only.

Links 33 are connected between the midpoints of the outer edges of the proof masses and the sensing frame for transforming torsional movement of the proof masses about the sense axes into linear movement of the sensing frame along the x-axis. Those links are connected to the frame by folded flexures 34 which are flexible in the y-direction and relatively stiff in the x-direction. They allow out-of-plane deflections of the proof masses in the drive mode while transferring sense mode responses to the sensing frame.

The position of the sensing frame and hence the torsional response of the proof masses is monitored by capacitors 36, 37 with electrode plates 38 which are affixed to the frame and interleaved with stationary plates 39 which are affixed to anchors 41. The capacitors are positioned on opposite sides of the frame and therefore react differentially to movement of the frame.

In this embodiment, the gimbals 26 deflect only in the out-of-plane torsional drive direction, whereas the linear springs or flexures 29 that suspend the proof masses from the gimbals allow the proof masses to oscillate only in the in-plane torsional sense mode relative to the gimbals. Thus, the suspension members utilized in the drive and sense modes are independent of each other, which minimizes undesired dynamic coupling between the two modes and suppresses the quadrature error and bias that result from such coupling.

Furthermore, the folded springs or flexures 32 which suspend the sensing frame 31 maintain it in perfect alignment with the sense direction.

Since the drive and sense mode responses of the proof masses are torsional, any external linear acceleration results in zero displacement of the proof masses. However since linear sense mode deflection of sensing frame 31 is coupled to the torsional sense mode response of the proof masses, the sensing frame deflects with linear acceleration in the x-direction.

In the sense mode, however, coupling link 24 and frame 31 deflect in opposite directions, with one being connected to the inner edges and the other being connected to the outer edges of the rotating proof masses. Hence, the net effect of the linear external acceleration can be expressed as $$k_x x = a_x (m_F - m_C).$$

By making the mass of the frame (including links 33 and flexures 34) equal to the mass of coupling link 24, the effect of any linear or angular acceleration can be nulled out, and susceptibility of the device to vibration is minimized.

Similarly, the device can be adapted for simultaneous detection of angular rate and linear acceleration by making the mass of the frame much greater than the mass of the coupling link. In that case, any linear acceleration along the deflection axis of the sensing frame can be detected by low-pass filtering of the output signals before demodulating them to extract the Coriolis signals.

Figure 2:
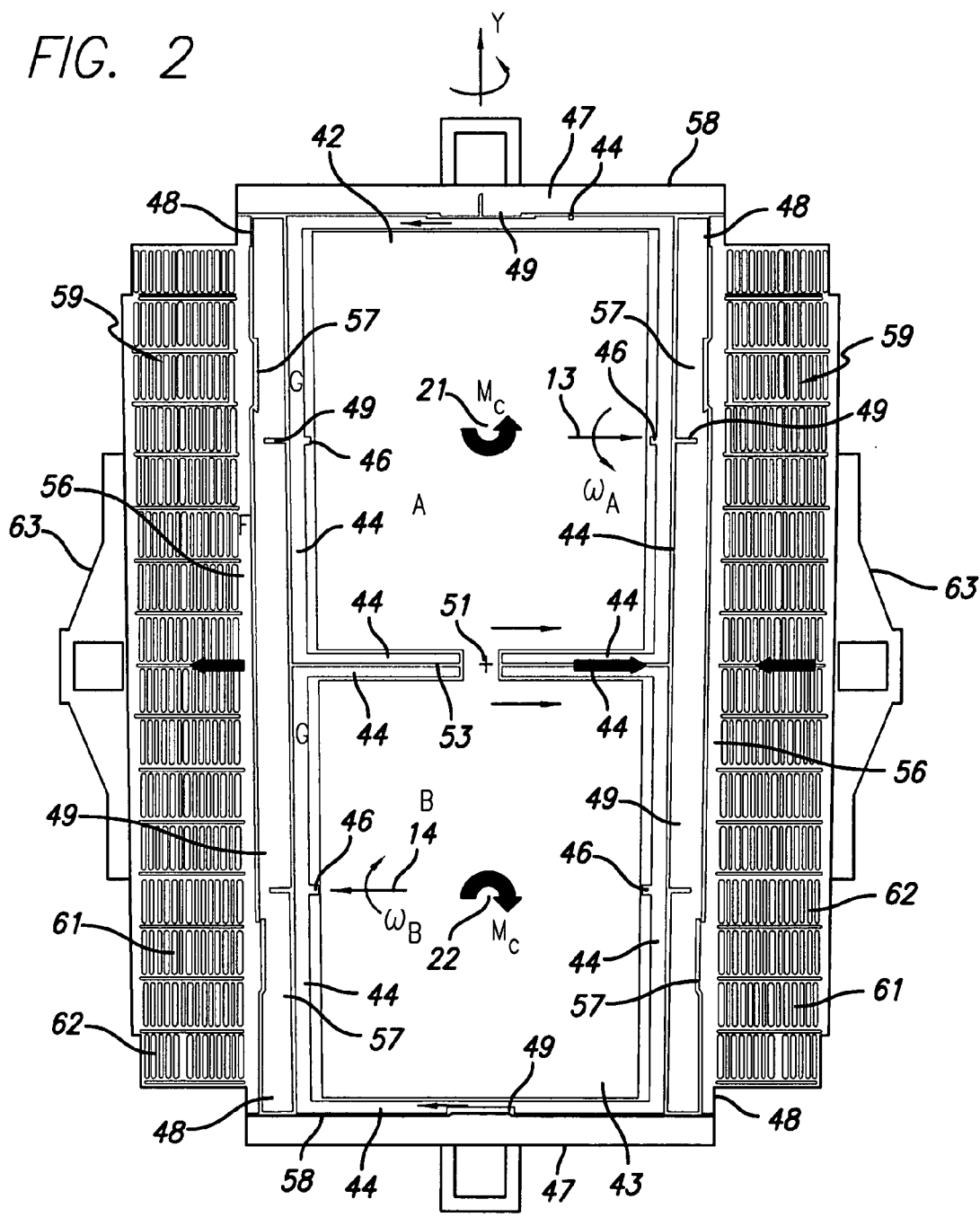
FIG. 2 is a top plan view of another embodiment of a rate sensor incorporating the invention.

The drive and sense modes can also be decoupled by suspending the proof masses from a structure that deflects only in the in-plane torsional sense mode, with the proof masses deflecting only in the torsional out-of-plane drive mode with respect to the supporting structure and the in-plane deflections of the supporting structure being coupled to the sensing frame. Such an embodiment is shown in FIG. 2.

Figure 2A:
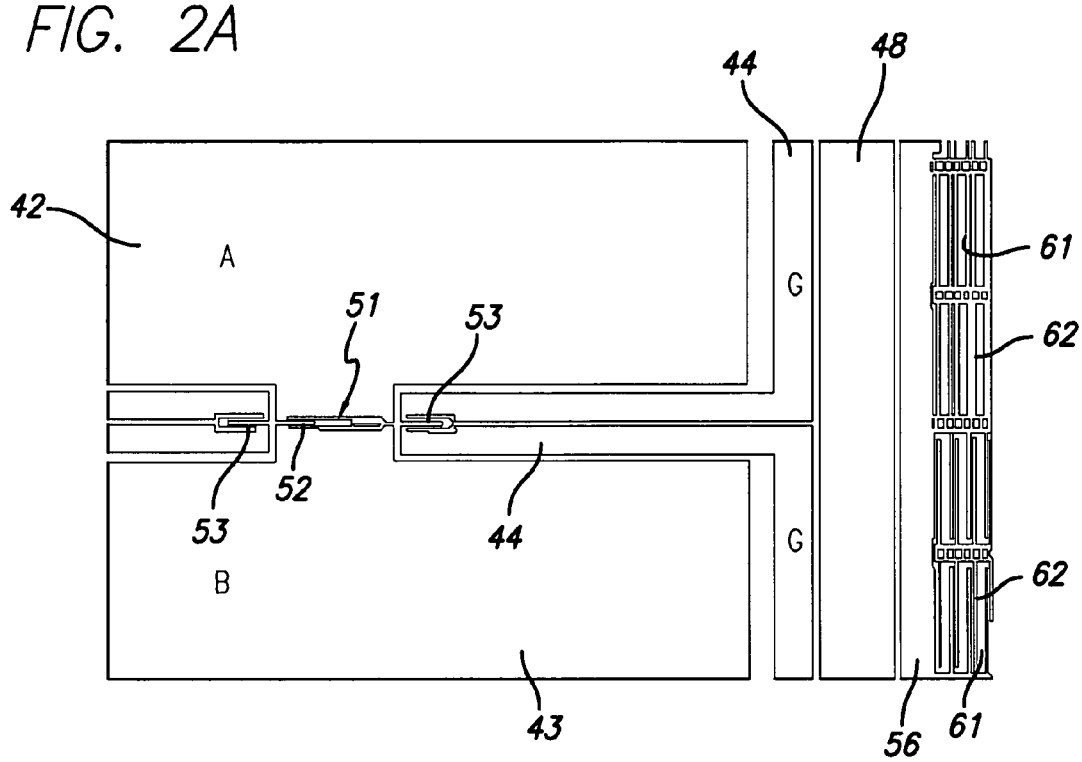
FIGS. 2A and 2B are enlarged fragmentary top plan views of portions of the rate sensor in the embodiment of FIG. 2.
Figure 2B:
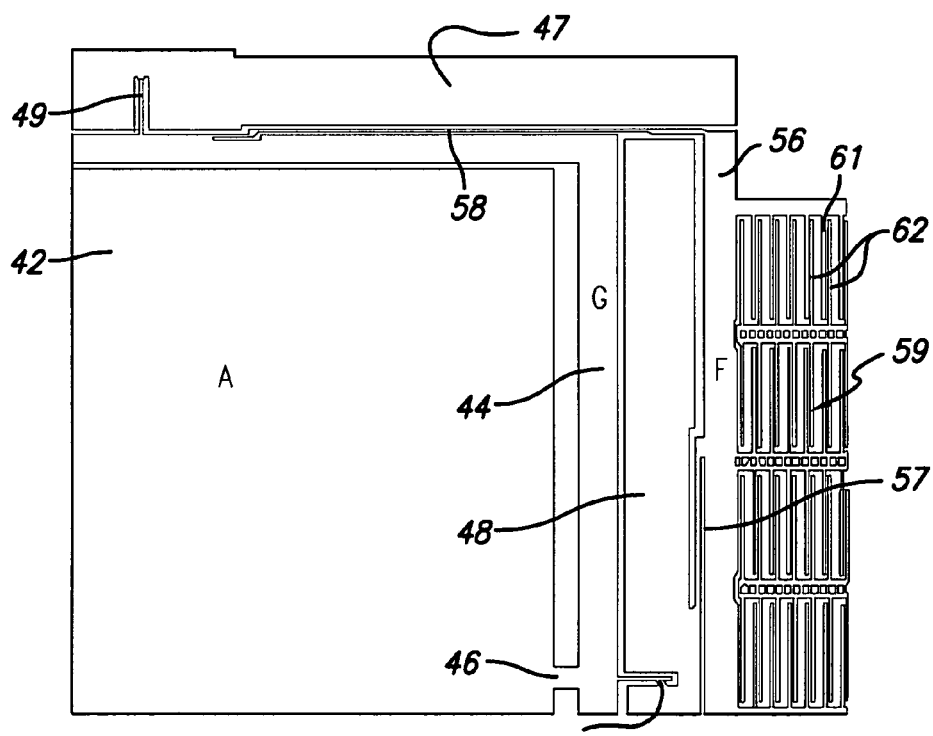

In this embodiment, proof masses 42, 43 are pivotally mounted on gimbals 44 by flexures 46 which permit out-of-plane torsional movement of the masses about drive axes 13, 14. The gimbals are suspended from anchors 47, 48 by flexures 49 for in-plane torsional movement about sense axes 21, 22. As best seen in FIG. 2A, the midpoints of the inner or adjacent edges of the proof masses are connected together by a coupling link 51 consisting of thin flexures 52 which extend in the x-direction. Thus, the inner portions of the masses are tied together for movement in concert both in the out-of-plane drive mode and in the in-plane sense mode, as in the embodiment of FIG. 1. The gimbals which support the two masses are connected together by flexures 53 in the region between the adjacent edges of the masses.

Sensing beams or frames 56 extend in a direction parallel to the input or y-axis on opposite sides of the masses and are suspended from anchors 48 by flexures 57 for linear movement along the drive axes. The ends of the sensing frames are connected to the outer edges of the proof masses by links 58. Linear movement of the sensing frames and, hence, the in-plane sense mode torsional movement of the proof masses is monitored by capacitors 59 consisting of plates 61 connected to the frames and stationary plates 62 connected to anchors 63.

As in the embodiment of FIG. 1, the proof masses are driven in an anti-phase manner, and Coriolis forces produced by rotation about the input axis cause the masses to oscillate in opposite directions about the sense axes, with the inner edges of the masses moving in one direction and the outer edges moving in the other. This torsional movement is converted to linear movement of the sensing frames and monitored by capacitors 59.

Figure 3:
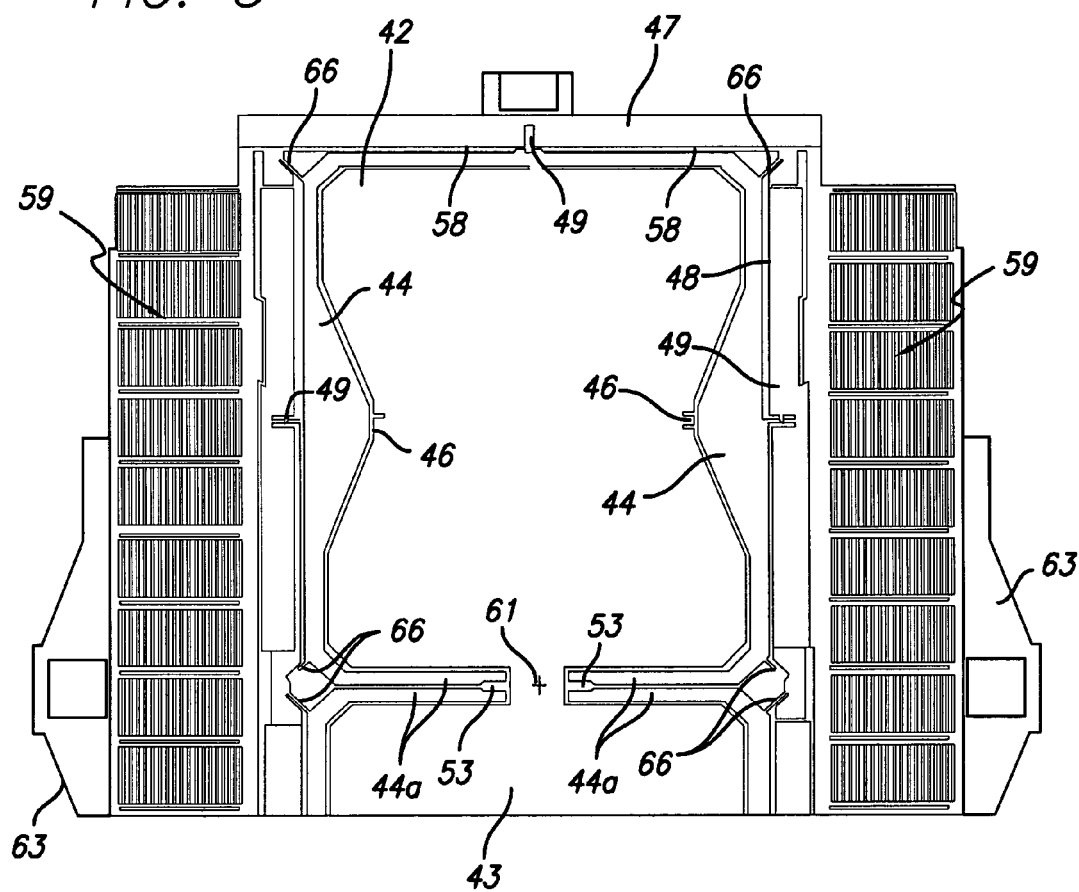
FIG. 3 is a fragmentary top plan view of another embodiment of a rate sensor incorporating the invention.

The embodiment of FIG. 3 is similar to the embodiment of FIG. 2, with the addition of diagonally extending flexures 66 at the corners of the gimbals. The additional flexures provide increased stiffness in the x and y directions and significantly reduce the susceptibility of the sensor to vibration. In this embodiment, the portions of the gimbals 44a between the proof masses serve as counterbalances, and the susceptibility to vibration can be reduced to zero by increasing the mass of these counterbalances.

Figure 4:
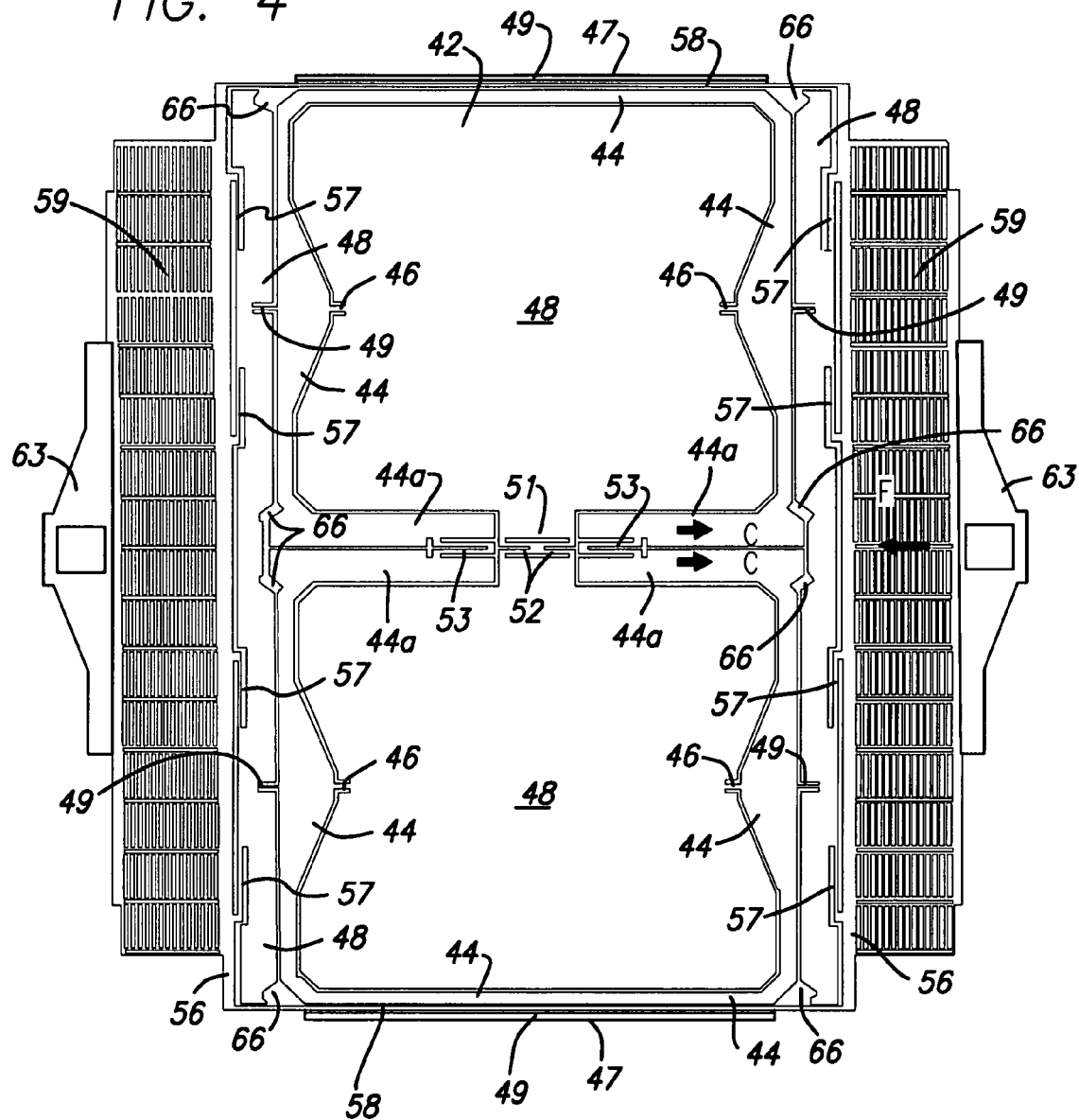
FIGS. 4 and 5 are top plan views of additional embodiments of a rate sensor incorporating the invention.
Figure 5:
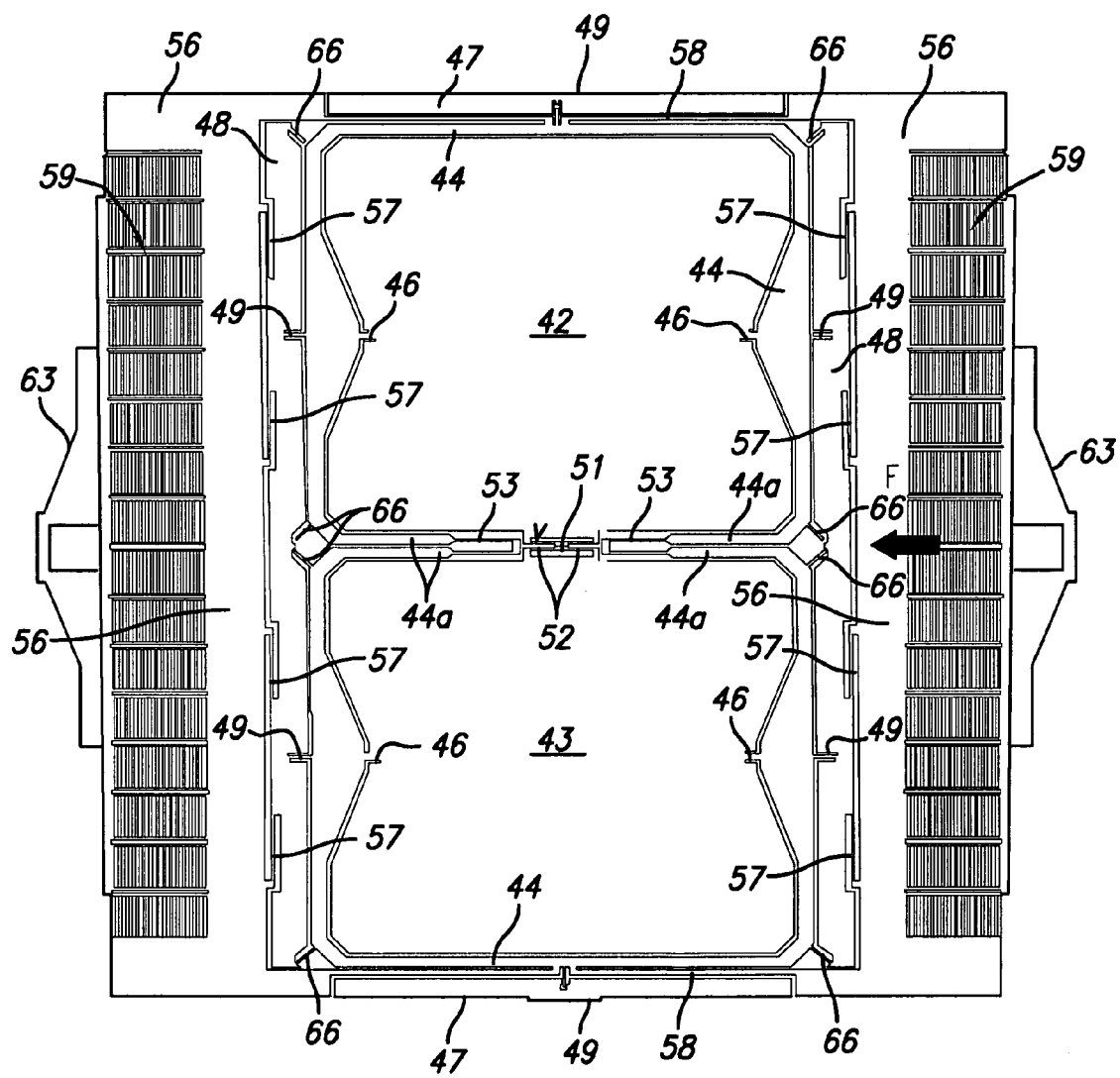

The embodiments of FIGS. 4 and 5 are similar to the embodiment of FIG. 3, and like reference numerals designate corresponding elements in all three of them. In the embodiment of FIG. 4, however, the arms 44a of the gimbals which serve as a counterbalance are made equal in mass to sensing frames 56 so the inertial force on the frame due to linear acceleration is nulled out by the inertial force on the counterbalance. In addition, each of the sensing frames is suspended from anchors 48 by a two pairs of flexures 57 instead of just one, which further stabilizes the device.

The embodiment of FIG. 5 is designed for simultaneous detection of angular rate and linear acceleration. In this embodiment, the mass of sensing frames 56 is made substantially larger than the mass of the counterbalance arms 44a, and the counterbalance mass is thus eliminated. The deflection due to linear acceleration along the deflection axis of the sensing frames is maximized and detected by low pass filtering of the output signals from capacitors 59 before demodulating those signals to extract the Coriolis signal.

Figure 6:
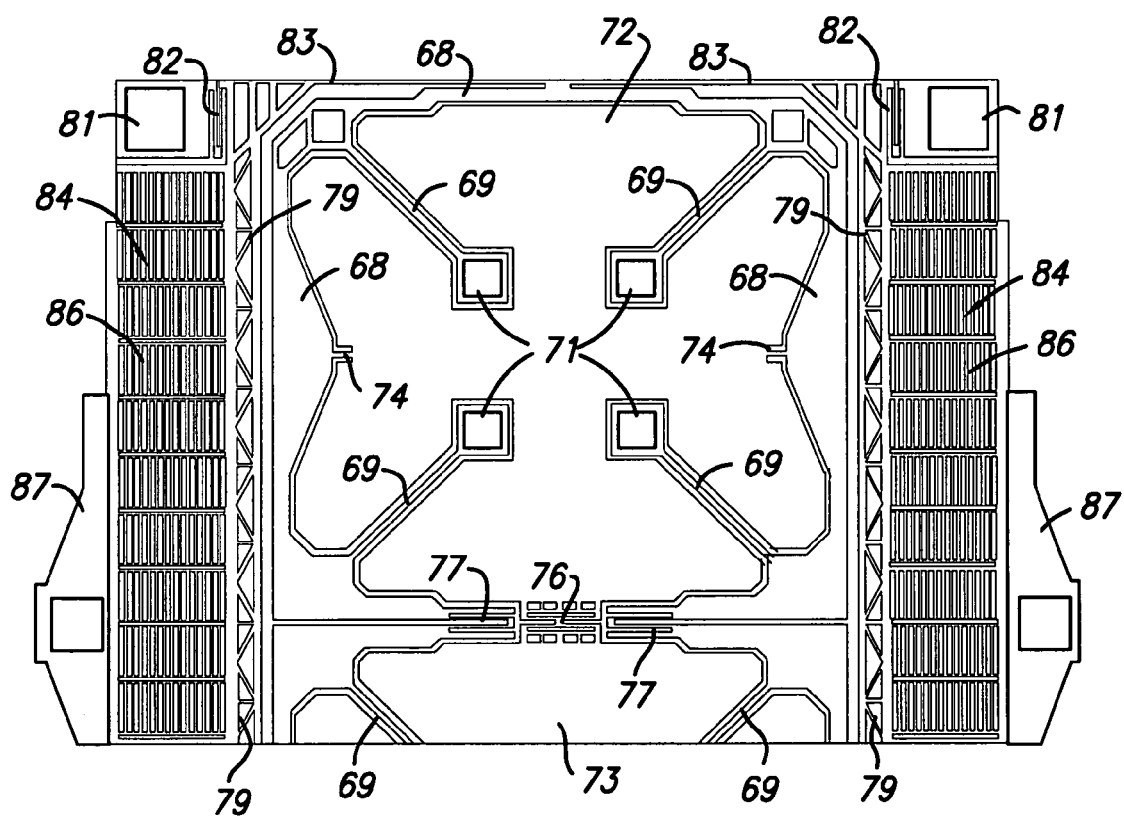
FIG. 6 is a fragmentary top plan view of another embodiment of a rate sensor incorporating the invention.

In the embodiment of FIG. 6, gimbals 68 are suspended by flexures 69 from anchors 71 which are located inboard or toward the centers of proof masses 72, 73. The flexures extend diagonally from the four corners of each of the proof masses and permit the torsional in-plane oscillation of the proof masses and gimbal in the sense mode. Having the anchors located close to the centers of the masses minimizes the effects of stress on the packaging of the sensor. If desired, the four flexures can be suspended from a single, centrally located anchor instead of the four separate anchors shown in this embodiment.

As in the previous embodiments, the proof masses are connected to the gimbals by flexures 74 for out-of-plane oscillation about the drive axes in the drive mode. The midpoints of the adjacent edges of the proof masses are connected together by a coupling 76, and the arms of the gimbals between the masses are connected together by flexures 77.

Sensing beams or frames 79 are suspended from anchors 81 by folded flexures 82 which constrain the frames for linear movement in the x-direction. The midpoints of the outer arms of the gimbals are connected to the frames by links 83 to transform sense mode oscillations of the proof masses and gimbals into linear motion of the frames. Those oscillations are monitored by capacitors 84 with interleaved plates 86 connected to the sensing frames and to anchors 87.

Finite element analysis of the embodiment shown in FIG. 6 shows that the first resonance mode of the structure is the anti-phase drive mode and that the second mode is the sense mode. The lowest unwanted resonance mode was also observed to be over 5 KHz higher than the sense mode, providing the desired separation of the unwanted modes from the operational modes. This mode separation cannot be achieved with any other known mechanically coupled system with two degrees of freedom.

Figure 7:
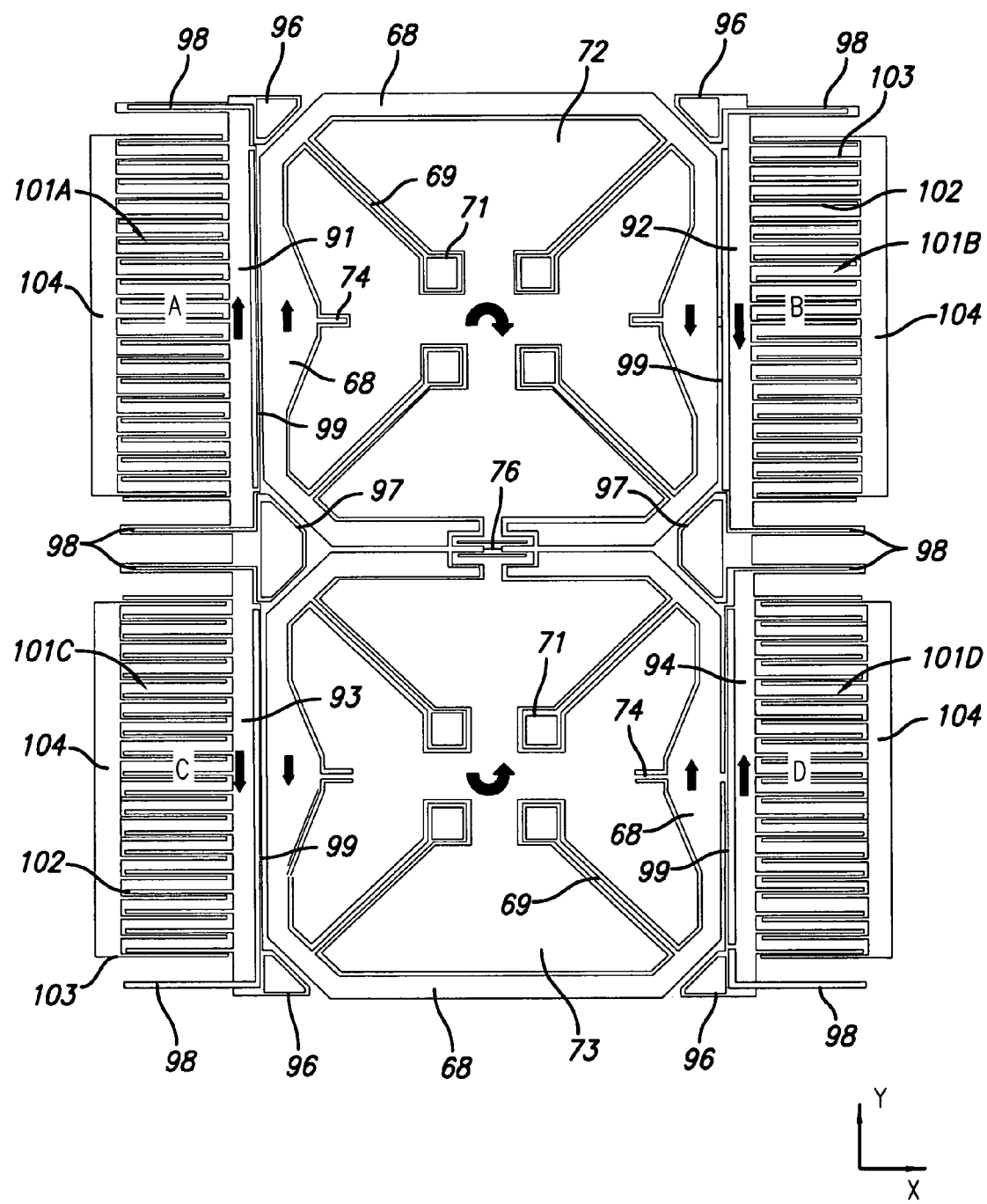
FIGS. 7-17 are top plan views of additional embodiments of a rate sensor incorporating the invention.

The embodiment of FIG. 7 is generally similar to the embodiment of FIG. 6, with gimbals 68 suspended by flexures 69 from inboard anchors 71 for torsional in-plane oscillation in the sense mode, proof masses 72, 73 connected to the gimbals by flexures 74 for out-of-plane oscillation about the drive axes in the drive mode, and the midpoints of the adjacent edges of the proof masses connected together by a coupling 76 for movement in concert.

In this embodiment, however, the detection frame is divided into four sections 91-94 which are suspended from anchors 96, 97 by folded flexures or springs 98 for movement independently of each other in the sensing (y) direction.

The midpoints of the side arms of the gimbals are connected to the frames by links 99 to transform torsional sense mode oscillations of the proof masses and gimbals about the z-axes into linear displacement of the frames. Those displacements are monitored by capacitors 101A-101D having interleaved plates 102, 103 connected to the sensing frames and to anchors 104.

As in the other embodiments, masses 72, 73 are driven to oscillate in see-saw fashion about the x-axes, and rotation about the y-axis causes the masses to oscillate about the z-axes, with the rotation about the z-axes being converted to linear movement of sensing frames 91-94. In this embodiment, however, the capacitor electrodes or plates extend in the x-direction, and the sensing frames move in the y-direction.

The flexures are orders of magnitude stiffer in all directions other than the sensing direction, which minimizes the motion of the sensing electrodes due to the drive motion and to any other spurious motion of the structure. It also provides better decoupling of the drive mode from the sense mode and minimizes quadrature error.

A significant advantage of the split frames is the ability to reject external accelerations as common mode by employing double differential detection, e.g. $(C_A+C_C)-(C_B+C_D)$, where $C_A$, $C_B$, $C_C$ and $C_D$ are the capacitances of capacitors 101A-101D. The split frames also minimize the total additional inertia of the detection frame.

Figure 8:
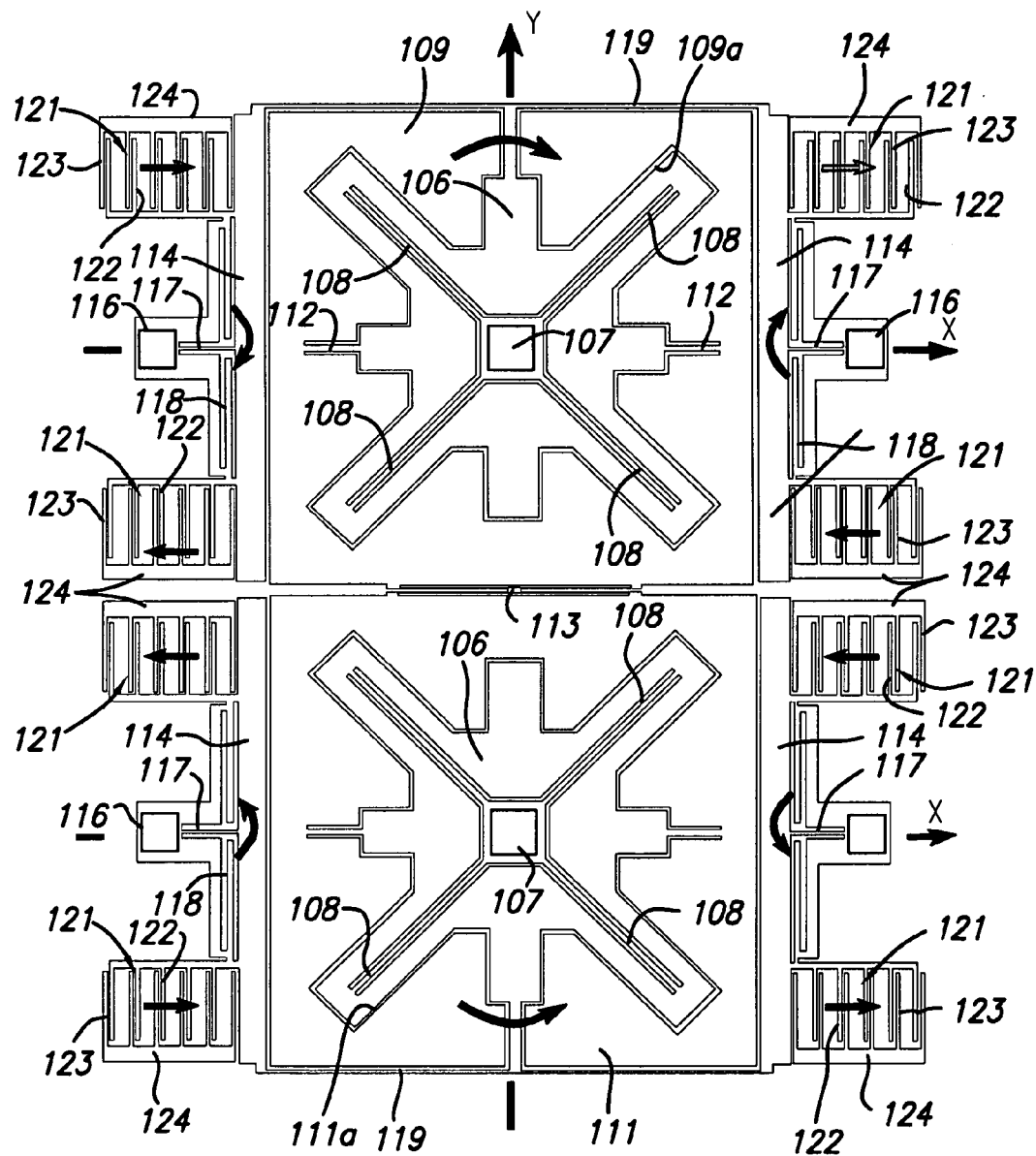

In the embodiment of FIG. 8, inner sensing frames 106 are suspended from anchors 107 by diagonally extending flexures 108 and thereby constrained for torsional movement only in the x, y plane. These frames are positioned within windows 109a, 111a in proof masses 109, 111, with the proof masses being suspended from the frames by torsional hinges 112 which permit the masses to pivot in see-saw fashion about x-axes in the drive mode but transmit sense mode motion about the z-axes to the frames.

The adjacent edges of the proof masses are connected together by a coupling 113 for movement in concert both in the z-direction in the drive mode and in the x-direction in the sense mode.

This embodiment also has four outer sensing frame sections 114 which are suspended from anchors 116 by a combination of flexures 117 and folded flexures 118 for rotational movement about z-axes. The outer frame sections are connected to inner sensing frames 106 by links 119 so that the outer sections rotate in concert with the inner frames. Rotation of the sensing frames is monitored by capacitors 121 which have interleaved plates 122, 123 connected to the outer sensing frames and to anchors 124.

In the drive mode, masses 109, 111 are driven out-of-phase and pivot in see-saw fashion about the x-axes. Rotation about the y-axis produces Coriolis forces which cause the masses to rotate in opposite directions about the z-axes. The rotation of the masses is transferred to inner sensing frames 106 by hinges 112 and then to outer frames 114 by links 119. The sensing capacitors at the ends of the outer frames are driven differentially, with the plates moving closer together at one end of each frame and farther apart at the other.

Having substantial portions of the sensing frames inside the proof masses minimizes the inertia of the sense mode, and the modes are effectively decoupled since the inner sense mode frames are free to oscillate only in the torsional sense mode and are strictly constrained in all other modes of motion.

The torsional hinges which connect the proof masses to the inner frames allow the masses to move relative to the frames in the drive mode while transmitting the sense mode responses of the masses to the sensing frames. Transmitting the sense mode oscillation of the inner frames to outer frames which carry the sensing electrodes provides differential torsional detection which enhances immunity to both linear vibration and angular vibration.

Figure 9:
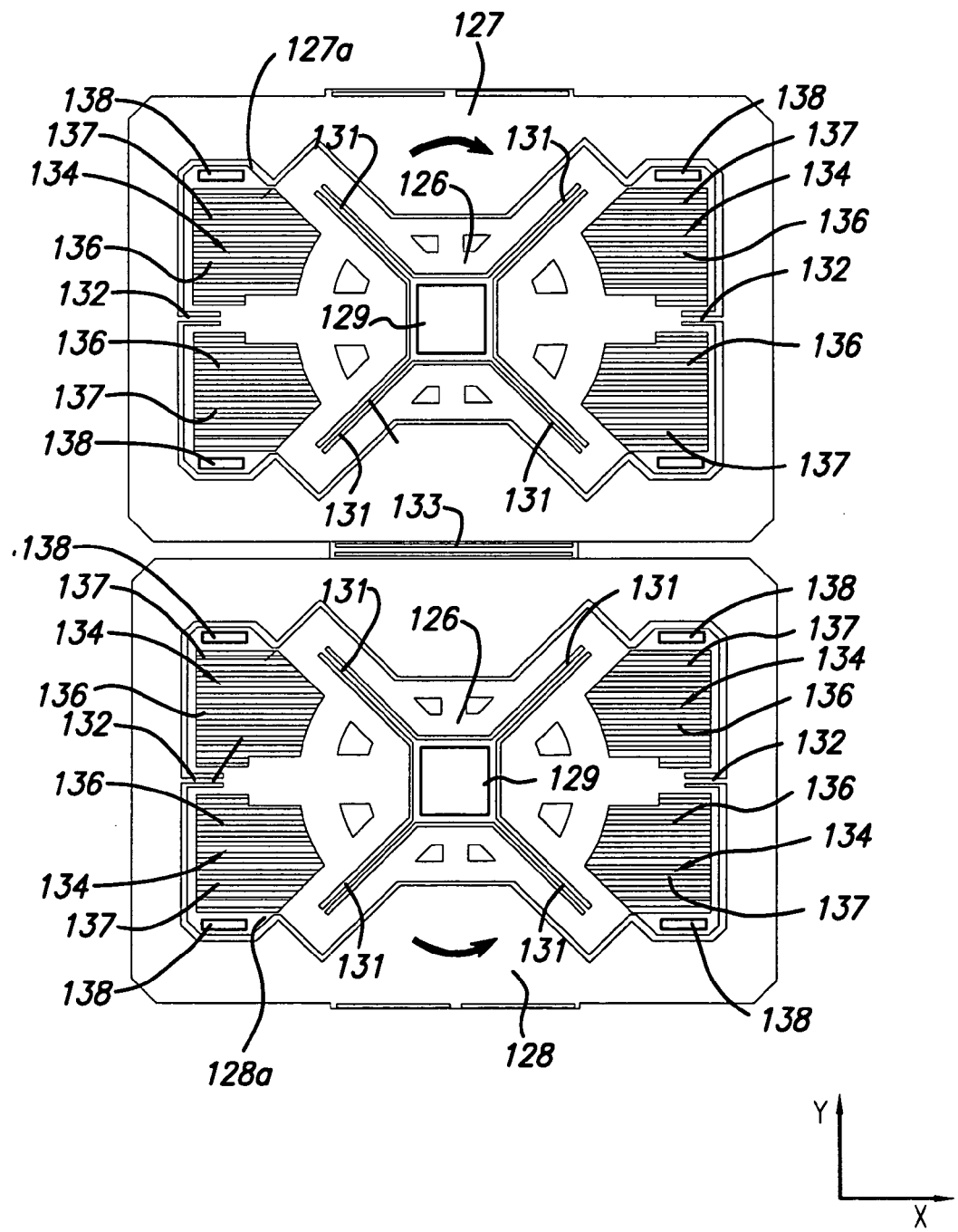

In the embodiment of FIG. 9, the sensing frames 126 are located entirely within windows 127a, 128a in proof masses 127, 128. As in the embodiment of FIG. 8, the sensing frames are suspended from central anchors 129 by flexures 131, and the proof masses are suspended from the sensing frames by torsion springs 132 which permit the masses to pivot in see-saw fashion about the x-axes, but transfer sense mode rotation about the z-axes from the masses to the frames.

The adjacent edges of the proof masses are connected together by a coupling 133 for movement in concert both in the z-direction in the drive mode and in the x-direction in the sense mode.

Rotation of the sensing frames is monitored by capacitors 134 which are also located entirely within the proof masses. These capacitors have electrodes or plates 136 which are attached directly to the sensing frames and interleaved with stationary electrodes or plates 137 affixed to anchors 138.

In operation, proof masses 127, 128 are driven to oscillate in an anti-phase manner about the x-axes, and the Coriolis forces produced by rotation about the y-axis cause the masses to rotate about the z-axes. This rotation is transferred to sensing frames 126 to move plates 136 and produce a change in the capacitance of sensing capacitors 134.

Having the capacitor plates attached directly to the sensing frame, with both the plates and the frame being positioned entirely within the masses permits the device to be constructed in compact form with essentially perfect symmetry, which makes this embodiment even more immune to linear and angular vibration than the embodiment of FIG. 8.

Figure 10:
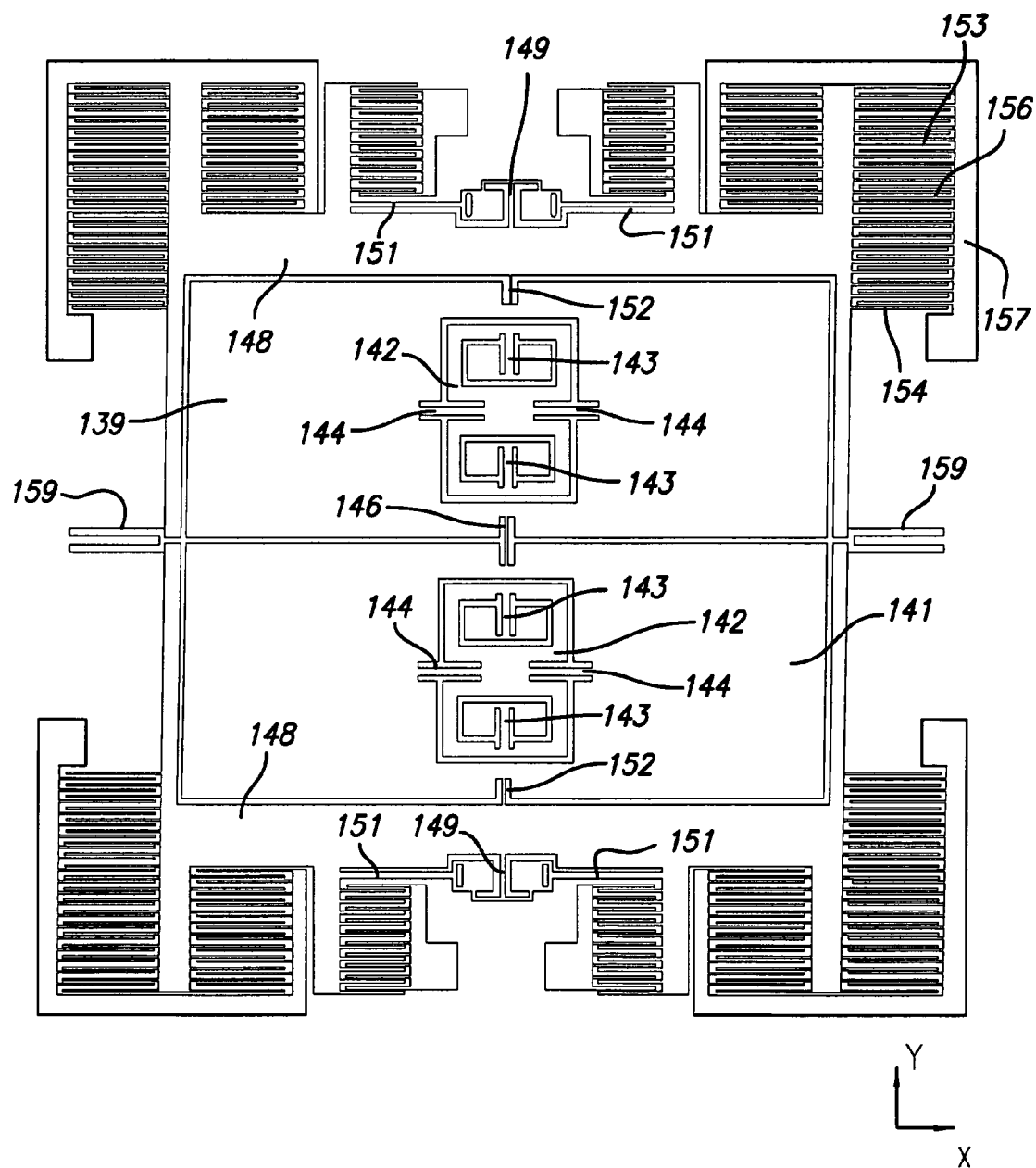

In the embodiment of FIG. 10, proof masses 139, 141 are mounted on frames 142 for rotation about the y-axis in the drive mode and the z-axis in the sense mode. The frames are mounted to the substrate by torsion springs 143 which extend in the y-direction and permit the frames to pivot in see-saw fashion about the y-axis, with the masses being connected to the frames by flexures or springs 144 which extend in the x-direction. The drive and sense modes of the masses are thus decoupled, with the drive mode frequency (rotation about the y-axis) being dominated by torsion springs 143 and the detection mode frequency (rotation about the z-axis) being determined primarily by the bending of springs 144.

Masses 139, 141 are identical, and frames 142 are positioned centrally of the masses, with the y- and z-axes of rotation passing through the physical centers of the masses.

Each of the masses is driven by an electrode (not shown) positioned beneath it for rotation about the y-axis in an anti-phase manner. The two masses are coupled together at the midpoints of their adjacent edges by a coupling spring 146 which permits the masses to be driven either in phase or out of phase. The spring separates the anti-phase drive mode from the in-phase mode, with the anti-phase frequency increasing with the stiffness of the spring, while the in-phase mode frequency remains the same. The coupling spring also constrains the two masses for rotation together about the z-axis so that when one mass rotates in one sense, the other must rotate in the opposite sense, thereby ensuring anti-phase proof mass motion in the detection mode.

Detection, or sensing, frames 148 are mounted to the substrate by flexures 149, 151 for rotation about the z-axis. These frames are coupled to the proof masses by link springs 152, which transfer rotational movement about the z-axes from the masses to the frames. Such rotation is monitored by capacitors 153 which have plates 154 attached to the frames and interleaved with stationary plates 156 affixed to anchors 157 on the substrate. These capacitors also provide feedback for force rebalancing.

Link springs 152 extend in the y-direction and are preferably made torsionally weak in order to minimize coupling between the drive mode oscillation of the masses and the detection frames. Such coupling could result in a slight vertical vibration of the capacitor plates carried by the frames which could detract from the performance of the sensor. At the same time, however, the springs should not be made so weak that the transfer of z-axis rotation is degraded.

To enhance immunity to angular vibration noise, coupling springs 159 are connected between the confronting arms of the detection frames. These springs are relatively soft in the y-direction and stiff in the x-direction in order to enhance coupling and ensure that the frames oscillate in a true anti-phase manner.

In operation, proof masses 139, 141 are driven to oscillate out-of-phase with each other in see-saw fashion about the y-axis, and rotation of the sensor about the x-axis results in out-of-phase Coriolis induced rotation of the masses about the z-axes. That rotation is transferred to detection frames 148 by link springs 152, with the rotation of each of the frames being opposite to that of the adjacent proof mass. Thus, for example, when mass 139 rotates in a clockwise direction about the z-axis, the upper link spring 152 forces the upper detection arm to rotate in a counter-clockwise direction about its z-axis. At the same time, mass 141 rotates in a counter-clockwise direction, and the lower detection frame rotates in a clockwise direction.

Having the two detection frames rotate in opposite directions provides a significant advantage in reducing the sensitivity of the device to vibration noise and angular acceleration about the z-axis.

Figure 11:
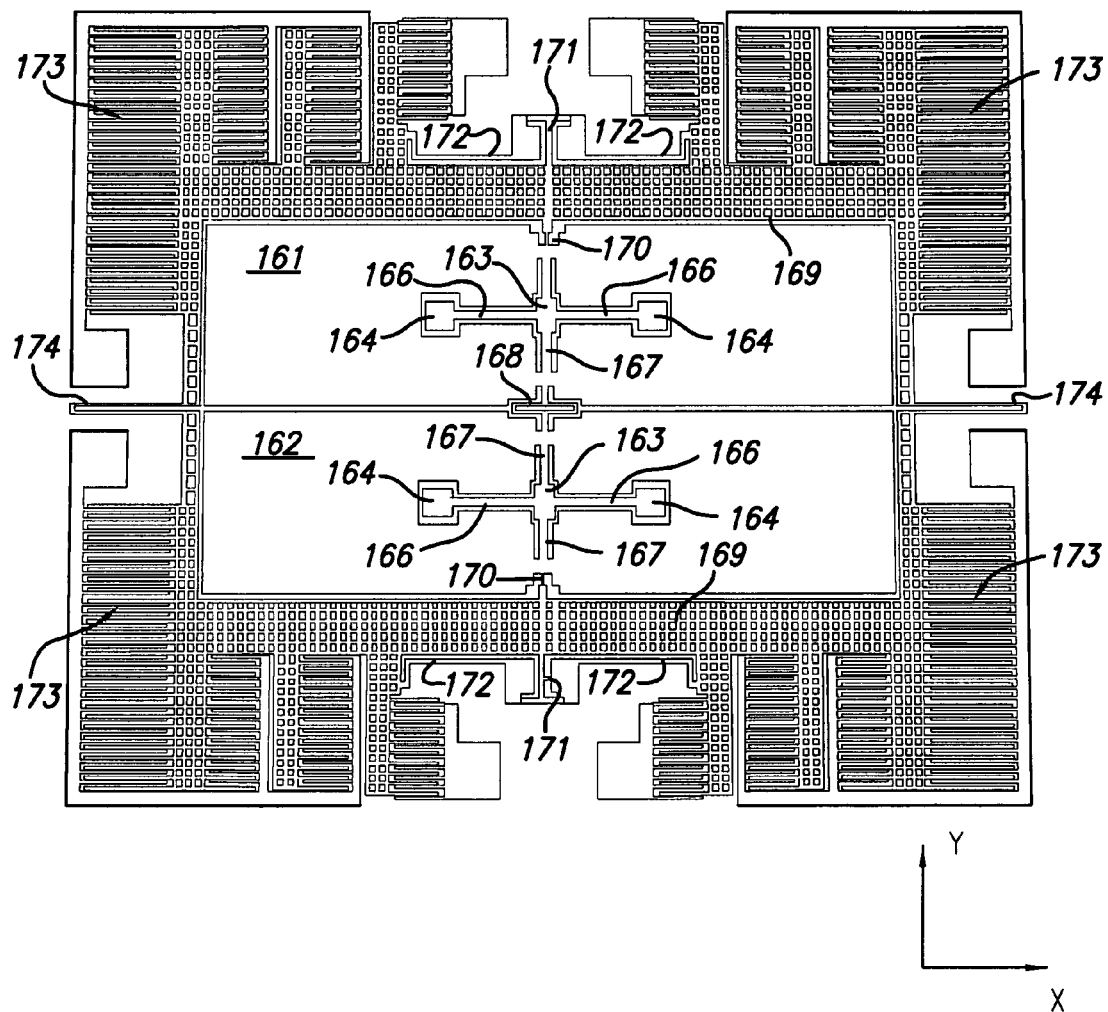

The embodiment of FIG. 11 is similar to that of FIG. 10 in that proof masses 161, 162 are mounted on frames 163 for rotation about the y-axis in the drive mode and the z-axis in the sense mode. The frames are mounted to anchors 164 on the substrate by flexures or torsion springs 166 which extend in the x-direction, and the masses are connected to the frames by flexures or torsion springs 167 which extend in the y-direction.

As in the previous embodiments, the two masses are coupled together at the midpoints of their adjacent edges by a coupling spring 168. This spring is in the form of a small rectangular frame, with relatively long, flexible flexures extending in the x-direction and relatively short, stiff ones in the y-direction. This design decouples the torsional stiffness of the spring about the y-axis for drive from the linear stiffness along the x-axis for detection while permitting the two masses to be driven either in an in-phase manner or in an anti-phase manner.

Detection, or sensing, frames 169 are coupled to the proof masses by link springs 170. These frames are similar to frames 148 in the embodiment of FIG. 10, although they are perforated to reduce the mass of the detectors. The frames are mounted to the substrate by flexures 171, 172 for rotation about z-axes, and the rotation of the frames, and hence the masses, is monitored by capacitors 173 which are similar to capacitors 153.

Coupling springs 174 are connected between the confronting arms of the detection frames. These springs are similar to coupling springs 159 in the embodiment of FIG. 10 in that they are relatively soft in the y-direction and stiff in the x-direction in order to enhance coupling and ensure that the frames oscillate in a true anti-phase manner. However, they are simpler than springs 159 in that they have only two leaves instead of four.

Operation and use of the embodiment of FIG. 11 is similar to that of the embodiment of FIG. 10, with coupling springs 168, and link springs 170 providing both good coupling of z-axis rotation between the proof masses and the detection frames in the sense mode and good isolation between the masses and the frames for y-axis rotation in the drive mode.

Figure 12:
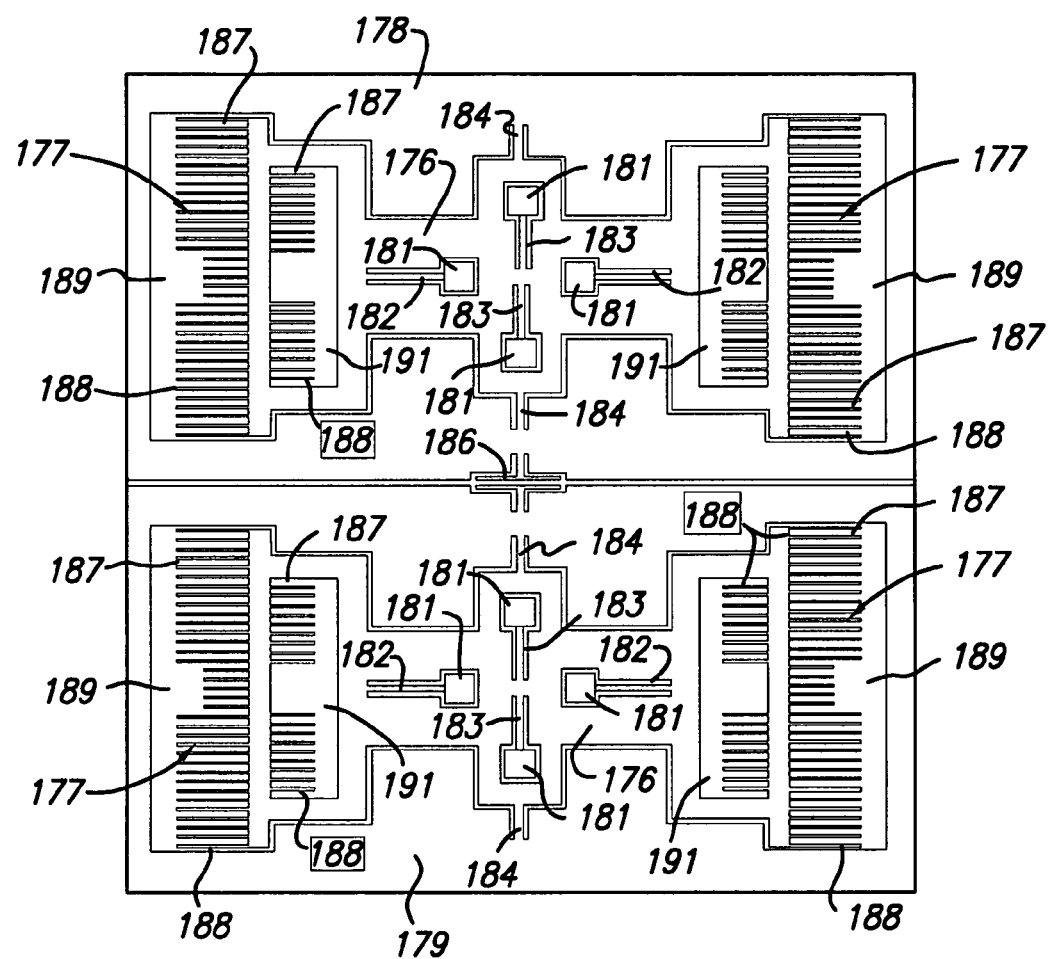

In the embodiment of FIG. 12, detection frames 176 and sensing capacitors 177 are located entirely within proof masses 178, 179, and the detection frames and the masses are symmetrical about the x- and y-axes and have the same centers of rotation in the sense mode. This effectively prevents rotational responses about the z-axis from being induced by linear acceleration along the x-axis because the detectors are inertially balanced along the x-axis with regard to their centers of rotation. Also, since the masses and the detectors have the same centers of rotation, there is no tendency to produce rotation about the z-axis as can happen when the rotation centers are separated and the linear displacements produced by linear acceleration along the x-axis are different.

Frames 176 are mounted to anchors 181 by flexures or springs 182, 183 which extend along the x- and y-axes that intersect at the centers of the masses and the frames. Each of the masses is connected to one of the frames by a pair of torsion springs 184 which extend along the y-axis, and the two masses are coupled together at the midpoints of their adjacent edges by a coupling spring 186 which is similar to spring 168 in the embodiment of FIG. 10. Since torsion springs 184 determine the in-phase drive mode frequency, they are normally made much stiffer than link springs 152 in the embodiment of FIG. 10.

Capacitors 177 have plates 187 which extend from frames 176 and are interleaved with stationary plates 188 attached to anchors 189, 191.

In this embodiment, proof masses 178, 179 are once again driven to oscillate in an anti-phase see-saw fashion about the y-axis, and rotation about the x-axis is sensed. The Coriolis forces produced by that rotation cause the masses to rotate in opposite directions about the z-axes which pass through the centers of the masses. The z-axis rotation is transferred to detection frames 176 by torsion springs 184, and the frames rotate in the same direction as the masses and about the same centers of rotation as the masses. As noted above, since the proof masses and the detectors are symmetrical about the x- and y-axes and have the same centers of rotation, this embodiment is substantially immune to linear acceleration along the x-axis.

Figure 13:
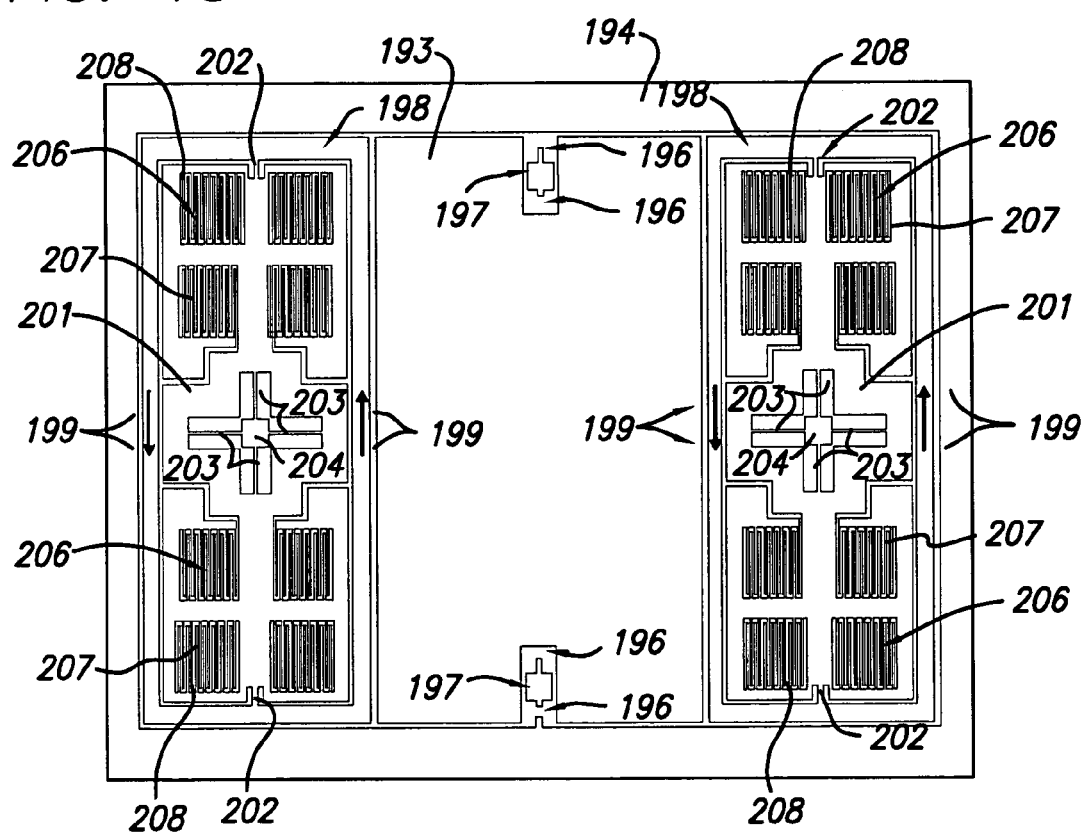

In the embodiment of FIG. 13, the rate sensor has two proof masses 193, 194 in the x-y plane, with mass 193 being positioned inside mass 194. Each mass is mounted to the substrate through a pair of torsion springs 196 attached to anchors 197 for rotation about the y-axis. Thus, instead of having spaced apart drive axes as in some of the other embodiments, these masses have coincident drive axes.

The ends of the masses are connected to a pair of coupling frames 198 by torsion springs 199, and each of the coupling frames is mounted on a detection frame 201 by additional torsion springs 202 which allow the coupling frames to rotate about the y-axis. The two masses are thus coupled together and constrained for rotation with equal amplitude in opposite directions. By proper design of the masses, the linear and angular momentum of the drive motion can be balanced.

Detection frames 201 are mounted on the substrate by flexures or springs 203 which are attached to anchors 204 at the centers of the frames for rotation about the z-axis.

In the presence of input rotation about the x-axis, the anti-phase drive motion generates Coriolis forces that cause masses 193, 194 to rotate about the z-axis in an anti-phase manner. This motion is transferred to detection frames 201 through coupling frames 198, resulting in in-phase rotational motion of the detection frames about the z-axes, with the coupling frames constraining the detection frames to rotate at the same amplitude and in the same direction about the z-axes, independent of frequency. The response to the rotation about the x-axis is monitored by capacitors 206 with plates 207 attached to the detection frames and static plates 208 on the substrate.

In this embodiment, the symmetry of both the drive elements and the detection elements provides for momentum balance, immunity to linear vibration excitation, and reduced susceptibility of these properties to variations in the fabrication process. The use of mechanical constraint rather than coupling springs enables the drive and detection modes to be the lowest frequency modes of the system. Also, since the proof masses are mounted to the substrate through their own anchors and connect to the detection frames through torsion springs, these springs can be made much weaker than the springs which mount the masses, thereby minimizing the leakage of driving motion into the detection frames, quadrature error, and other spurious error signals. The weaker coupling springs also minimize the inertia forces induced on the detection frames by the masses due to externally applied accelerations.

Figure 14:
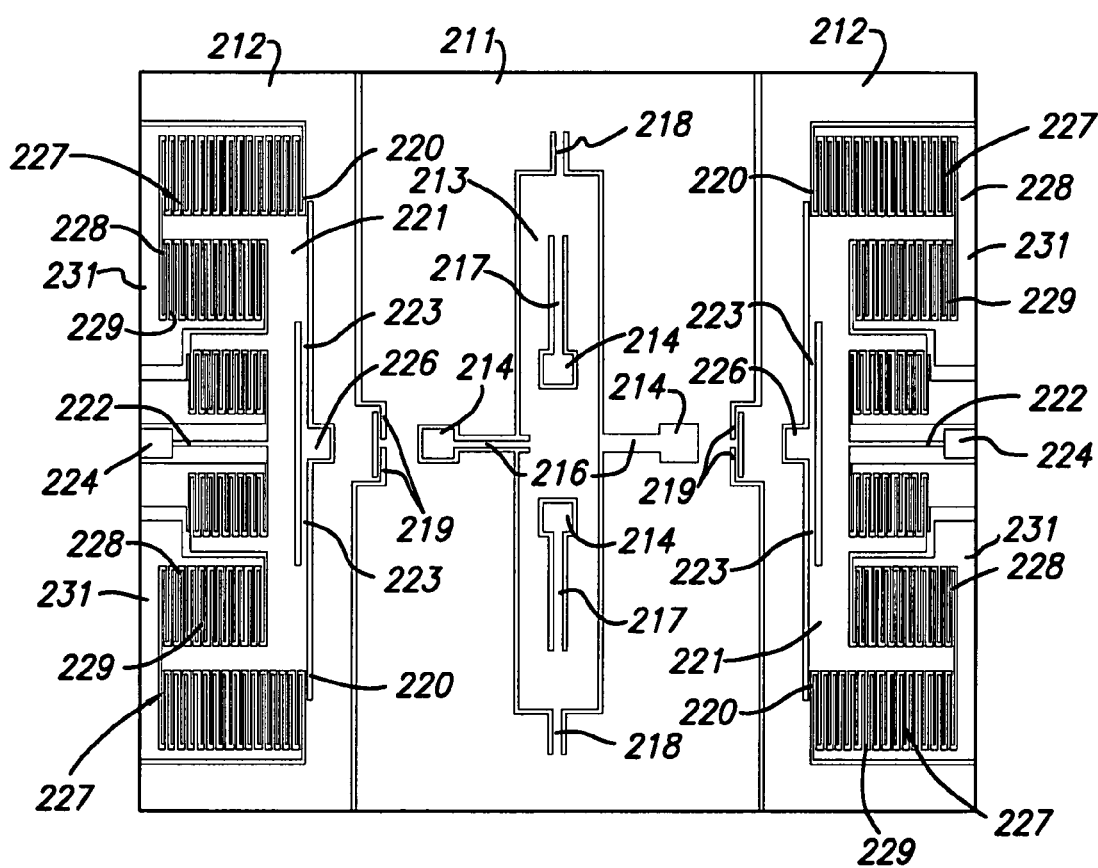

The embodiment of FIG. 14 has a proof mass 211 and a pair of coupling frames 212 which also serve as proof masses. Mass 211 is mounted on a frame 213 which is mounted to anchors 214 by springs or flexures 216, 217 for rotation about the z-axis at the center of the mass, and it is connected to the frame by torsion springs 218 for rotation about the y-axis. Mass 211 is connected to coupling frames 212 by torsion springs 219 which are similar to torsion springs 199 in the embodiment of FIG. 13.

Torsion springs 220 connect coupling frames 212 to detection frames 221 which are constrained for rotation about z-axes by flexures 222, 223 connected to anchors 224, 226. The coupling frames are generally U-shaped and extend along three sides of the detection frames. Rotation of the detection frames is monitored by capacitors 227 which have electrodes or plates 228 attached to the frames and stationary electrodes or plates 229 affixed to anchors 231. The open sides of the detection frames simplify fabrication of the device in that they permit the electrodes to be routed out from the side without the need for backside vias through the substrate.

In operation, proof mass 211 and coupling frames 212 are driven to oscillate in see-saw fashion about y-axes, with the coupling frames being out of phase with the proof mass and in phase with each other. Coriolis forces produced by rotation about the x-axis cause the proof mass and the coupling frames to rotate about z-axes, with the frames once again in phase with each other and out of phase with the proof mass. The z-axis rotation of the coupling frames is transferred to detection frames 221 by torsion springs 220.

Since the rotation of coupling frames 212 is opposite to that of proof mass 211 in the drive mode, the drive momentum can be balanced relatively easily by proper design of these masses, as can inertia balance in the detection mode for the rejection of angular vibration. In addition, pivotally mounted frame 213 helps to decouple the out-of-plane drive motion of the proof mass from the rotational sense motion of that mass and detection frames 212.

Figure 15:
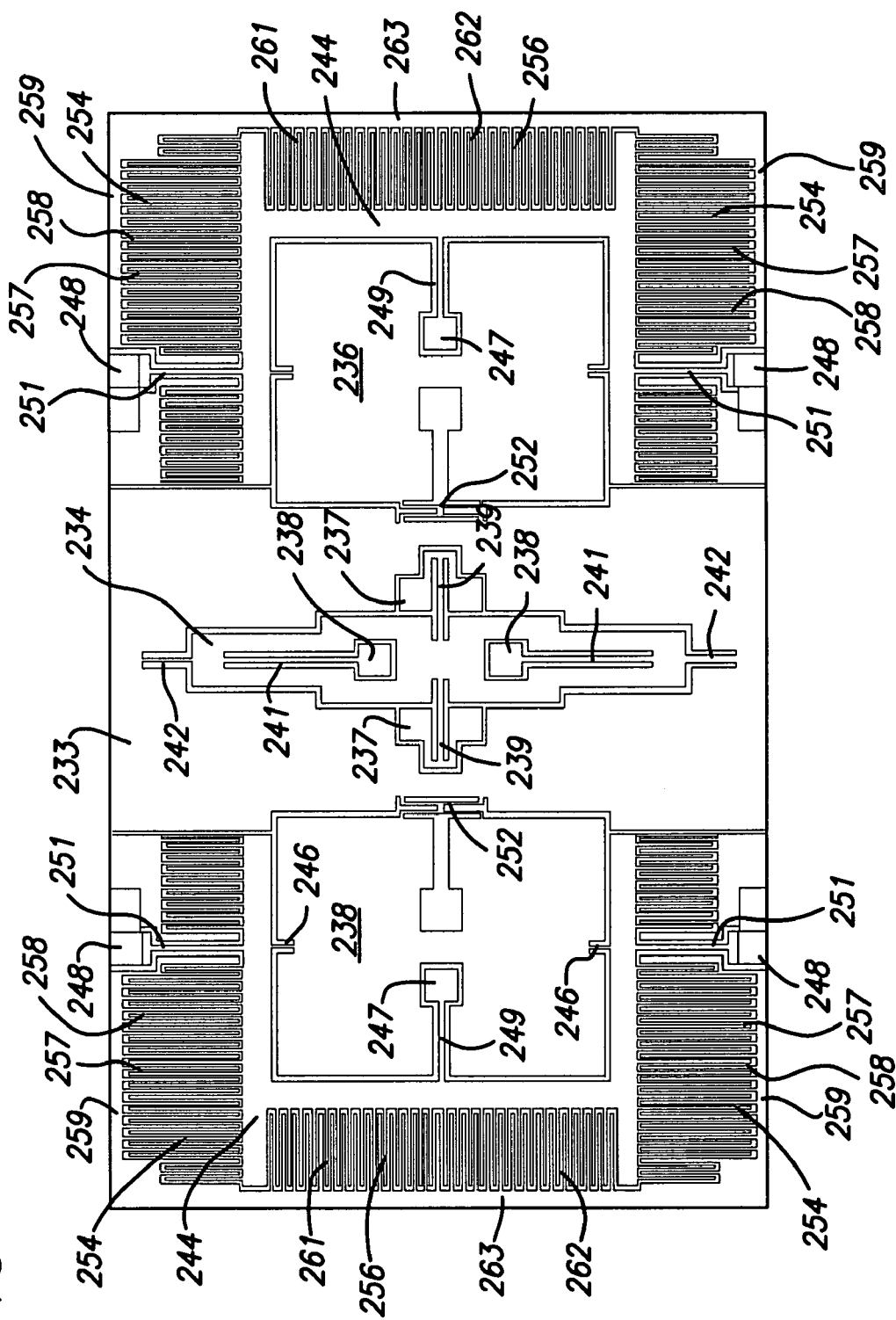

The embodiment of FIG. 15 has a central proof mass 233 which is mounted on a frame 234 for rotation about the y- and z-axes and a pair of outer proof masses 236 on opposite sides of the central mass. The frame is mounted to anchors 237, 238 by flexures 239, 241 for rotation about the z-axis at the center of mass 233, and the mass is connected to the frame by torsion springs 242 for rotation about the y-axis.

Each of the outer proof masses 236 is rotatively mounted on a detection frame 244 by torsion springs 246 for rotation about the y-axis which passes through the center of the mass, and the detection frames are mounted to anchors 247, 248 by flexures or springs 249, 251 for rotation about the z-axes at the centers of the masses. Flexures 251 extend in the y-direction and are aligned along common axes with torsion springs 246.

The outer edges of central proof mass 233 are connected to the adjacent edges of outer proof masses 236 by couplings 252 whereby the outer masses are constrained for out-of-phase movement relative to the central mass and in-phase movement relative to each other about both the y- and z-axes.

Detection frames 244 are generally U-shaped and extend along three sides of outer proof masses 236. Rotational movement of the proof masses about the z-axes is monitored by capacitors 254, 256. Capacitors 254 have electrodes or plates 257 on the detection frames and interleaved with stationary electrodes or plates 258 affixed to anchors 259, with the plates extending in the y-direction and being spaced apart in the x-direction. Capacitors 256 have electrodes or plates 261 on the detection frames and interleaved with stationary electrodes or plates 262 affixed to anchors 263, with the plates extending in the x-direction and being spaced apart in the y-direction.

In the drive mode, central proof mass 233 is driven out of phase with outer proof masses 236 for oscillation about the respective y-axes. Rotation about the x-axis produces Coriolis forces which cause the masses to rotate about their z-axes, with the outer masses being out of phase with the central mass and in phase with each other.

Outer masses 236 are symmetrical in shape, which provides more robustness against process variations in maintaining momentum balance, and detection efficiency is increased by having detection frames 244 outside those masses. In the sense mode, the rotation of the outer masses in phase with each other and in phase opposition to the central mass produces a net cancellation of linear and angular momentum. The torsional springs and flexures provide a high level of decoupling between the drive and sense motions, and the symmetry of the sensor makes it insensitive to externally applied accelerations.

Figure 16:
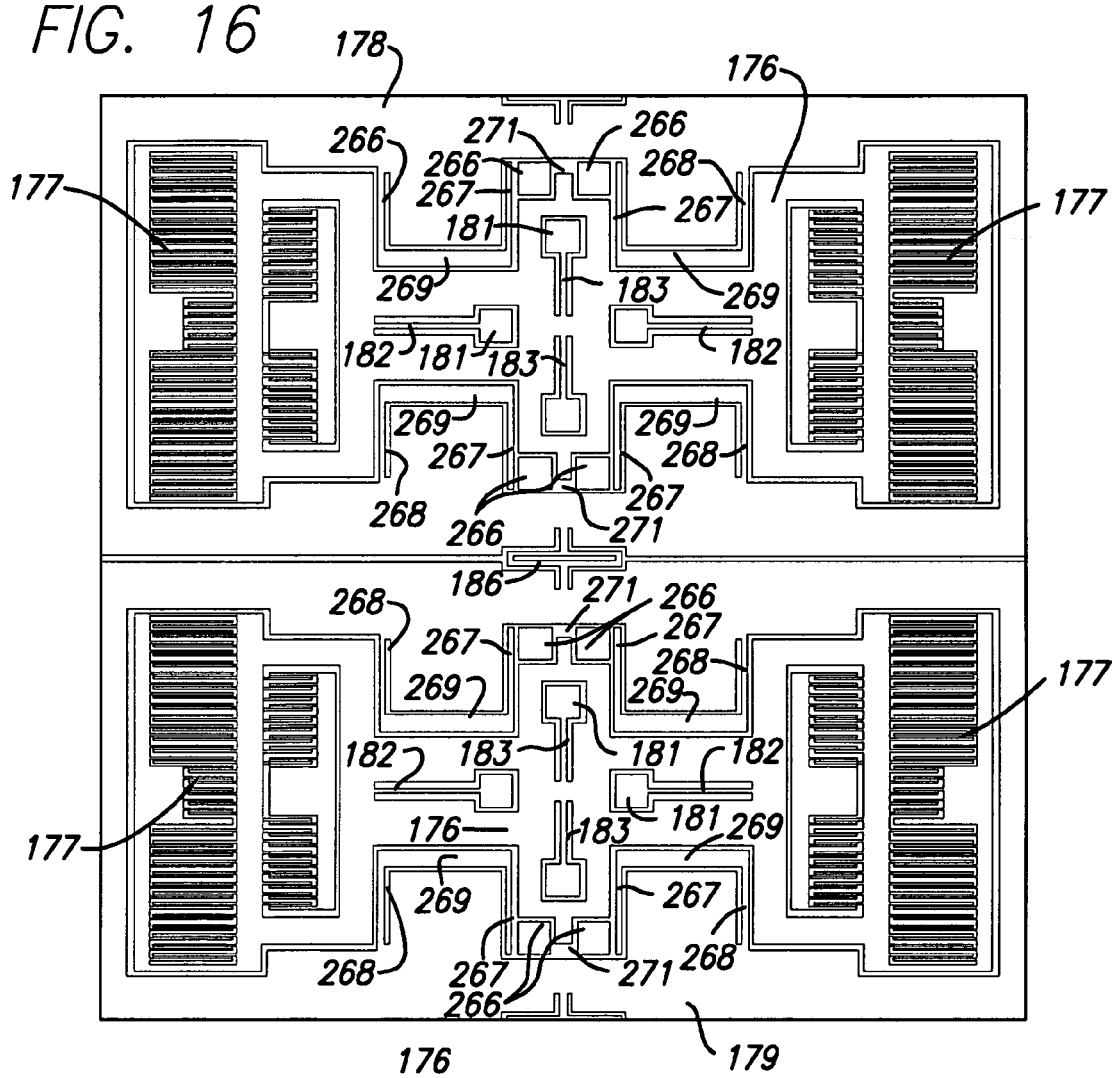

The embodiment of FIG. 16 is similar to the embodiment of FIG. 12, and like reference numerals designate corresponding elements in the two. In the embodiment of FIG. 16, however, proof masses 178, 179 are suspended from anchors 266 by drive springs consisting of torsion springs 267, 268 and a rigid connecting bar 269. The drive springs have a generally U-shaped configuration, with the two torsion springs being spaced apart and extending parallel to the y-axis and the bar extending between them. At the ends opposite the bars, springs 267 are connected to the anchors, and springs 268 are connected to the masses. Each of the masses is suspended by four of the drive springs which are disposed symmetrically of the y-axis and the centers of the masses. These springs constrain the masses for see-saw movement about the y-axis and rotational movement about the z-axes which pass through the centers of the masses.

The masses are connected to sensing frames 176 by link springs 271 which are substantially weaker than springs 267, 268 in torsional stiffness.

In operation, proof masses 178, 179 are driven to oscillate in an anti-phase see-saw fashion about the y-axis, and rotation about the x-axis is sensed. The Coriolis forces produced by that rotation cause the masses to rotate in opposite directions about the z-axes which pass through the centers of the masses. The z-axis rotation is transferred to detection frames 176 by link springs 271, and the frames rotate in the same direction as the masses and about the same centers of rotation as the masses. Since the proof masses and the detectors are symmetrical about the x- and y-axes and have the same centers of rotation, this embodiment is substantially immune to linear acceleration along the x-axis.

Moreover, with drive springs 267, 268 being much stiffer torsionally than link springs 271, the drive springs dominate the in-phase drive mode frequency, and the transfer of angular momentum from the drive mode to the sensing frame is greatly reduced, resulting in significantly less vertical motion of the sensing frame.

Figure 17:
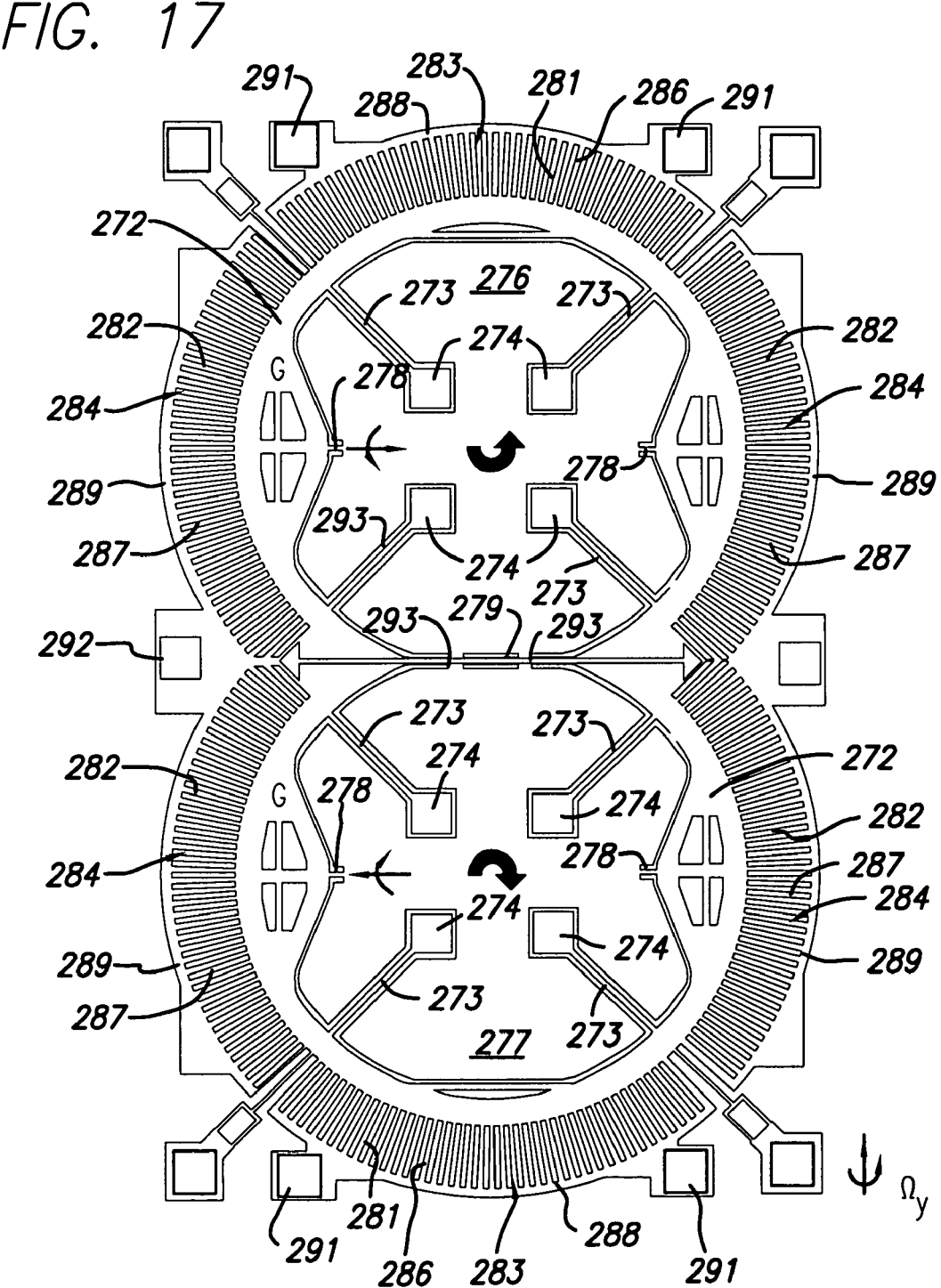

The embodiment of FIG. 17 is similar to the embodiment of FIG. 7 in that gimbals 272 are suspended by diagonally extending flexures 273 from inboard anchors 274 for torsional in-plane oscillation in the sense mode. Proof masses 276, 277 are connected to the gimbals by torsion springs 278 for out-of-plane oscillation about the drive axes in the drive mode, and the midpoints of the adjacent edges of the proof masses connected together for movement in concert by a coupling 279.

In this embodiment, however, the proof masses and gimbals are generally circular, and the movable electrodes or plates 281, 282 of feedback capacitors 283 and sensing capacitors 284 are attached directly to the gimbals rather than to separate sensing frames. The fixed electrodes or plates 286, 287 of the capacitors are mounted in a stationary position on frames 288, 289 attached to anchors 291, 292. The inner end portions of the gimbals are connected together by couplings 293.

As in the embodiment of FIG. 7, the sensing capacitors are divided into four separate sections, and a differential torsional detection scheme can be employed. That provides a significant improvement in immunity to linear and angular vibration. Moreover, with the capacitor plates attached directly to the gimbals, the structure of this embodiment is much simpler than those which separate sensing frames.

In operation, masses 276, 277 are driven to oscillate in see-saw fashion about the x-axes which pass through their centers, and rotation about the y-axis causes the masses to oscillate about the z-axes which pass through their centers. The rotation about the z-axes is transferred to gimbals 272 by torsion springs 278 and monitored by capacitors 284. With their inner edge portions coupled together, the two masses are constrained for rotation in opposite directions, as are the two gimbals.

As in the embodiment of FIG. 7, the sensing capacitors are divided into four separate sections, and a differential torsional detection scheme can be employed. That provides a significant improvement in immunity to linear and angular vibration. Moreover, with the capacitor plates attached directly to the gimbals, the structure of this embodiment is much simpler than those which separate sensing frames.

It is apparent from the foregoing that a new and improved rate sensor has been provided. While only certain presently preferred embodiments have been described, as will be apparent to those familiar with the art, certain changes and modifications can be made without departing from the scope of the invention as defined by the following claims.

The invention claimed is:

1. A rate sensor comprising two generally planar proof masses, means for driving the masses to oscillate in phase opposition about parallel drive axes in the planes of the masses, an input axis perpendicular to the drive axes, sense axes perpendicular to the drive axes and the input axis, means mounting the masses for torsional movement about the sense axes in response to Coriolis forces produced by rotation of the masses about the input axis, means constraining the two masses for anti-phase movement about both the drive axes and the sense axes, sensing frames coupled to the masses for movement in response to the torsional movement of the masses about the sense axes, and means responsive to movement of the sensing frames for monitoring rate of rotation about the input axis.

2. The rate sensor of claim 1 wherein the means constraining the two masses comprises a mechanical link between adjacent edges of the masses.

3. The rate sensor of claim 1 wherein the means for monitoring the rate of rotation comprises capacitors having plates which move relative to other plates in response to the movement of the sensing frames.

4. The rate sensor of claim 1 wherein the sensing frames are constrained for linear movement in response to the torsional movement of the masses.

5. The rate sensor of claim 1 wherein the sensing frames are constrained for rotational movement in response to the torsional movement of the masses.

6. A rate sensor comprising two generally planar proof masses mounted side-by-side for anti-phase torsional movement about a pair of spaced apart drive axes, an input axis perpendicular to the drive axes, sense axes perpendicular to the drive axes and the input axis, means mounting the masses for torsional movement about the sense axes in response to Coriolis forces produced by rotation of the masses about the input axis, means connecting adjacent inner edge portions of the two masses together for movement in concert about both the drive axes and the sense axes, a sensing frame constrained (or linear movement, and links connecting the masses to the sensing frame for transforming torsional motion of the masses about the sense axes to linear motion of the sensing frame.

7. The rate sensor of claim 6 wherein the masses are mounted on gimbals which are rotatable about the drive axes, with flexures mounting the masses to the gimbals for torsional movement about the sense axes.

8. The rate sensor of claim 6 wherein the masses are mounted on gimbals for torsional movement about the drive axes, and the gimbals are mounted on flexures which permit torsional movement of the gimbals and the masses about the sense axes.

9. The rate sensor of claim 8 wherein the flexures are connected to anchors outside the masses.

10. The rate sensor of claim 8 wherein the flexures are connected to anchors near the centers of the masses.

11. The rate sensor of claim 6 wherein the means connecting the inner edge portions of the two masses together comprises a coupling link.

12. The rate sensor of claim 11 wherein the sensing frame and the coupling link have equal masses and linear acceleration of the sensing frame and the coupling link in a direction parallel to the drive axes balance each other out.

13. The rate sensor of claim 11 wherein the sensing frame has a greater mass than the coupling link and the sensor is responsive to linear acceleration of the sensing frame in a direction parallel to the drive axes as well as to rotation about the input axis.

14. A rate sensor comprising two generally planar proof masses, a drive axis in the plane of each of the masses, means for driving the masses to oscillate in phase opposition about the drive axes, an input axis perpendicular to the drive axes, sense axes perpendicular to the drive axes and the input axis, means mounting the masses for torsional movement about the sense axes in response to Coriolis forces produced by rotation of the masses about the input axis, means constraining the two masses for anti-phase movement about both the drive axes and the sense axes, a pair of sensing frames coupled to opposite sides of each of the masses for movement in opposite directions in response to the torsional movement of the masses about the sense axes, and electrode plates on the sensing frames which move in opposite directions relative to fixed plates on the opposite sides of the masses to form capacitors which change value in opposite directions in response to the torsional movement of the masses about the sense axes.

15. The rate sensor of claim 14 wherein the drive axes are spaced apart and parallel to each other.

16. The rate sensor of claim 14 wherein the sensing frames are constrained for movement in directions perpendicular to the drive axes.

17. The rate sensor of claim 14 wherein the means mounting the masses comprises a pair of gimbals on which the masses are pivotally mounted for movement about the drive axes, and flexures mounting the gimbals for rotational movement about the sense axes.

18. The rate sensor of claim 17 wherein the flexures are connected to anchors near the centers of the masses.

19. A rate sensor comprising a pair of spaced apart, parallel drive axes, an input axis perpendicular to the drive axes, sense axes perpendicular to the drive axes and the input axis, a pair of generally planar proof masses pivotally mounted on inner frames for see-saw movement about the drive axes, with the inner frames being located entirely within the lateral confines of the masses and being mounted for rotational movement about the sense axes, sensing frames mounted on opposite sides of the masses for rotation about axes parallel to the sense axes, means for transferring rotational movement of the masses to the sensing frames, and electrode plates on the sensing frames which are interleaved with fixed plates to form capacitors which change in value in response to rotational movement of the masses about the sensing axes.

20. The rate sensor of claim 19 wherein the inner frames are mounted by flexures which extend from anchors at the centers of the masses.

21. The rate sensor of claim 19 wherein the masses and the inner frames are symmetrical about the drive axes and the input axes.

22. The rate sensor of claim 19 including a mechanical link connecting adjacent edge portions of the masses together for movement in concert about the drive axes and the sensing axes.

23. A rate sensor comprising a pair of spaced apart, parallel drive axes, an input axis perpendicular to the drive axes, sense axes perpendicular to the drive axes and the input axis, a pair of generally planar proof masses pivotally mounted on sensing frames for see-saw movement about the drive axes, means mounting the sensing frames for rotational movement about the sense axes, means for transferring rotational movement of the masses to the sensing frames, and electrode plates on the sensing frames which are interleaved with fixed plates to form capacitors which change in value in response to rotational movement of the masses about the sensing axes, with both the sensing frames and the capacitors being located entirely within the lateral confines of the masses.

24. The rate sensor of claim 23 wherein the sensing frames are mounted by flexures which extend from anchors at the centers of the masses.

25. The rate sensor of claim 23 wherein the masses and the inner frames are symmetrical about the drive axes and the input axes.

26. The rate sensor of claim 23 including a mechanical link connecting adjacent edge portions of the masses together for movement in concert about the drive axes and the sensing axes.

27. A rate sensor comprising a pair of generally planar proof masses pivotally mounted within generally circular gimbals for see-saw movement about a pair of spaced apart, parallel drive axes, an input axis perpendicular to the drive axes, sense axes perpendicular to the drive axes and the input axis, means mounting the gimbals and the masses for torsional movement about the sense axes, and electrode plates extending radially from the gimbals interleaved with fixed electrodes to form capacitors which change in value in accordance with torsional movement of the masses about the sense axes in response to Coriolis forces produced by rotation of the masses about the input axis.

28. The rate sensor of claim 27 wherein the sensing frames are mounted by flexures which extend outward from anchors near the centers of the masses.

29. The rate sensor of claim 27 wherein the plates form separate capacitors on opposite sides of the masses, and the values of the capacitors on the opposite sides change in opposite directions.

30. The rate sensor of claim 27 including a mechanical link connecting adjacent edge portions of the masses together for movement in concert about the drive axes and the sensing axes.

31. A rate sensor comprising two generally planar proof masses, means for driving the masses to oscillate in phase opposition about parallel drive axes in the planes of the masses, an input axis perpendicular to the drive axes, sense axes perpendicular to the drive axes and the input axis, means mounting the masses for torsional movement about the sense axes in response to Coriolis forces produced by rotation of the masses about the input axis, means constraining the two masses for anti-phase movement about both the drive axes and the sense axes, and at least one sensing frame responsive to the torsional movement of the masses about the sense axes.

* * * * *